United States Patent [19]

Chung

[11] Patent Number: 5,312,520
[45] Date of Patent: May 17, 1994

[54] METHOD OF METALLIC SURFACE PREPARATION UTILIZING SILANE FOR ADHESIVE BONDING

[75] Inventor: Jaycee H. Chung, Rockwall, Tex.

[73] Assignee: E-Systems, Inc., Dallas, Tex.

[21] Appl. No.: 6,490

[22] Filed: Jan. 21, 1993

[51] Int. Cl.$^5$ .......................... B08B 7/00; B24C 1/00
[52] U.S. Cl. .......................................... 134/7; 134/26; 134/42; 134/2; 51/319; 51/320; 156/636
[58] Field of Search ........................ 134/7, 26, 42, 2; 51/319, 320; 156/636

[56] References Cited

U.S. PATENT DOCUMENTS

| | | | |
|---|---|---|---|
| 3,030,238 | 4/1962 | Cohn | 134/26 |
| 3,833,416 | 9/1974 | Fleischer | 134/7 |
| 4,343,838 | 8/1982 | Baker | 51/319 |
| 4,666,465 | 5/1987 | Matsumoto et al. | 134/7 |
| 4,833,093 | 5/1989 | Malmqvist et al. | 134/42 |

OTHER PUBLICATIONS

A Method for On-Aircraft Anodizing: "Phos-Anodizing Containment System"–by Westerman, E. A., and Taylor, D. F. (1992).

Primary Examiner—R. Bruce Breneman
Assistant Examiner—Zeinab El-Arini
Attorney, Agent, or Firm—Harold E. Meier

[57] ABSTRACT

To prepare a metallic surface for adhesive bonding, surface irregularities and contaminants are removed. This first step is followed by repeated cleaning of the metallic surface with a solvent and testing of the metallic surface for uniformity. Next, new surface material is exposed by blasting or abrading the surface material. Subsequently, the surface is cleaned and again tested for uniformity. Finally, the surface is treated with a silane solution and dried prior to bonding.

22 Claims, 2 Drawing Sheets

METHOD OF METALLIC SURFACE PREPARATION UTILIZING SILANE FOR ADHESIVE BONDING

TECHNICAL FIELD

The present invention relates to methods of surface preparation for bonding, and more specifically to a method of metallic surface preparation utilizing silane for adhesive bonding.

BACKGROUND OF THE INVENTION

Surface preparation is a key factor in the bonding of two or more materials. Since bonding occurs at the surface of the two materials to be bonded, the condition of those surfaces are of critical importance. The foregoing is particularly true for the cases involving the bonding of at least one metallic surface (e.g., composites-to-metal, glass-to-metal, etc.) with an adhesive. The quality, and hence reliability, of boding of the materials achieved will be directly related to the surface roughness and cleanliness of the surfaces to be bonded.

The preparation of metallic surfaces for adhesive bonding is typically accomplished by one of two methods well known in the industry: phosphoric acid etching or sulfuric acid etching. For example, as the names suggest, Phosphoric Acid Anodizing (PAA), Phosphoric Acid Non-Tank Anodizing (PANTA) and Phos-Anodizing Containment System (PACS) methods of surface preparation all employ phosphoric acid etching. On the other hand, the Forest Product Laboratory (FPL) method of metallic surface preparation utilizes sulfuric acid etching.

Use of these existing techniques pose serious health and environmental problems. The threat presented by the use of toxic substances in these prior art techniques has resulted in current Environmental Protection Agency (EPA) and Occupational Safety and Health Administration (OSHA) policies to reduce, and eventually eliminate, the use of phosphoric and sulfuric acids for adhesive bonding purposes. Additionally, the existing methods often preclude simple and inexpensive preparation of the surface due to the complex procedures and equipment involved with the use of toxic substances. Finally, the exacting procedures and complicated equipment necessitated by use of toxic substances allows very little tolerance for error.

Thus a need has arisen for a safe, simple and inexpensive method of metallic surface preparation for adhesive bonding, whereby the use of complicated procedures and potentially dangerous toxic substances is significantly reduced or eliminated.

SUMMARY OF THE INVENTION

The present invention overcomes the foregoing and other problems associated with the prior art by providing method of surface preparation wherein non-toxic materials are utilized in quick, simple steps to prepare a metallic surface for adhesive bonding.

The present invention is a method of metallic surface preparation for adhesive bonding. First, any surface irregularities or contaminants are removed from the metallic surface to be bonded. This is accomplished by scrubbing the metallic surface with an abrasive pad. The pad is wetted with a solvent to facilitate the removal of foreign substances in this step.

Next, the surface is cleaned with a solvent. The solvent is applied with a clean cloth to the entire surface to be bonded. Repeated applications are often necessary to remove all residue from the earlier step of removing irregularities and contaminants. Once all residues ar removed, the surface is dried with a clean, dry cloth. A water break test is then performed to test the uniformity of the surface. If the water forms an unbroken water film across the entire surface, then the process continues. If the surface "fails" the water break test, the first two steps are repeated until the surface displays an unbroken film of water when tested.

Once the surface passes the water break test, the next step in the method of the present invention is to expose a fresh layer of the surface material. This step is accomplished either by blasting the surface with a pressure-driven particle mixture such as sand or alumina grit or by abrading the surface with an abrasive material. The exposed material is then cleaned with a solvent. The water break test is now performed again on the newly exposed and cleaned surface. If the water break test is passed, the method continues. If the newly exposed and cleaned surface fails the water break test, the exposing and cleaning steps are repeated until the surface passes the water break test.

The next step in the surface preparation method of the present invention involves the chemical modification of the surface. This is accomplished by treating the surface with diluted silane. The silane solution is brushed on the surface in a manner to activate the silane solution. Once the surface is thoroughly coated with the silane solution, the surface is allowed to dry.

Finally, the silane-treated surface is dried in air and the surface is ready for bonding.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE DRAWINGS

Figure 1:
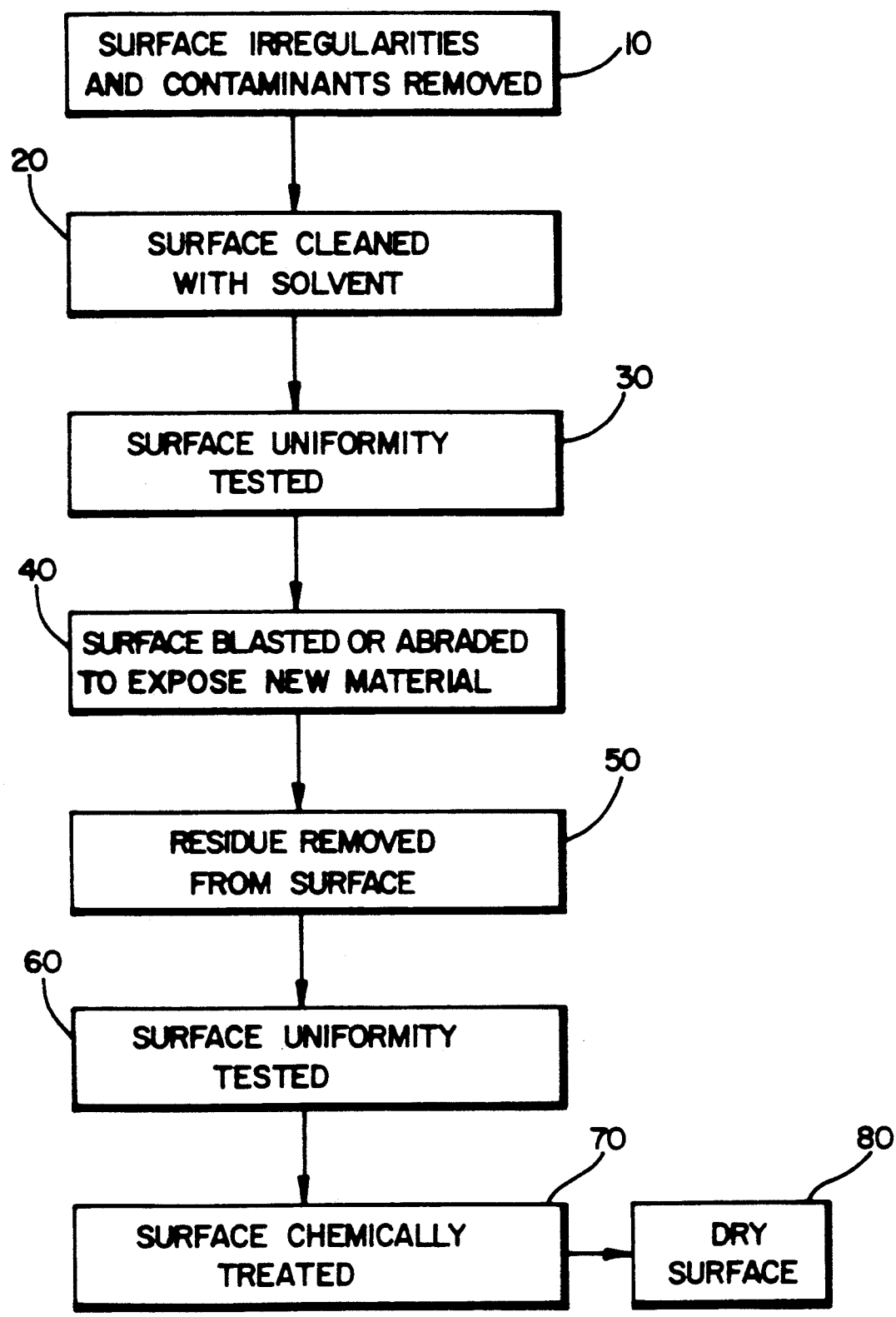
FIG. 1 is a flow chart representing the steps associated with the surface preparation method of the present invention.

Referring now to FIG. 1, there is illustrated a flow chart representing the steps associated with the surface preparation method of the present invention.

In step 10, any irregularities, such as scratches or gouges, and contaminants or any other foreign substances are removed from the metallic surface. This step is accomplished with the aid of an abrasive material. A Scotchbrite TM Type-A pad, for example, is an abrasive pad used successfully during this step. The pad is coated with a solvent, such as methyl-ethyl-ketone (MEK), before the surface irregularities or contaminants are removed. Although use of an abrasive pad is described, it should be noted that any suitable abrasive material could be utilized, if desired.

Once the surface irregularities and contaminants have been removed, in step 20 the metallic surface is cleaned to remove any residue. The metallic surface is thoroughly cleaned with a generous amount of a solvent such as MEK by repeatedly applying layers of the solvent to the metallic surface with a clean cloth. Once any residue has been removed, the surface is dried with a clean cloth. Although MEK is the solvent described, it should be noted that other suitable solvents may be utilized, if desired.

Next, the metallic surface is tested for uniformity in step 30. A "water break" test is used to determine the uniformity of the metallic surface. A generous amount of deionized water is added to the metallic surface completely covering the surface with a thin film of the water. Next the film of water is observed for approximately twenty (20) seconds. If the surface supports the water film (i.e., the film is not broken) during the observation period, the surface "passes" the water break test. If the surface "fails" the water break test (i.e., the film breaks during the observation period), the above steps of removing any surface irregularities, if necessary, and cleaning the surface with a solvent are repeated until the water break test is passed.

Passing the water break test indicates the surface is sufficiently uniform to proceed to the next step of the present invention. In step 40, fresh material making up the surface is exposed. This is accomplished either by blasting the metallic surface with a pressure-driven particle mixture or by abrading the surface with an abrasive material.

In one embodiment of the present invention, the surface of the material is blasted with an alumina grit comprising 50-micron alumina particles propelled by nitrogen gas. The maximum pressure at which the metallic surface material should be blasted is approximately forty (40) psi. In another embodiment, the surface is blasted with a sand mixture comprising fine particles of $SiO_2$ propelled by nitrogen gas. Again, the maximum pressure used is approximately 40 psi. Although alumina grit and sand have been described, any particle mixture of sufficient size to expose, without warping, new surface material may be used, if desired.

In a different embodiment, new material is exposed by abrading the surface with an abrasive pad, such as a Scotchbrite TM Type-A pad. Preferably, abrasion should be carried out over the entire surface area to be bonded, using alternating strokes. In other words, the surface should be covered first with side-to-side strokes followed by end-to-end strokes. If the metallic surface to blasted or abraded is relatively thin, care should be exercised to avoid warpage during the step. The goal of this step is to obtain a uniformly and lightly abraded surface.

The metallic surface is cleaned in step 50 to remove any residue created during the blasting or abrading in step 40. In this step MEK or other suitable solvent is repeatedly applied to the surface with a clean cloth until all of the residue is removed. When a clean cloth is wiped across the surface and remains clean, the surface is sufficiently clean to proceed to the next step.

In step 60, the water break test is again employed as in step 30 to check the uniformity of the metallic surface. If the surface passes the water break test, the surface is further processed as detailed below. If the surface does not pass the water break test, the surface is cleaned again with MEK or other suitable solvent.

In step 70, the metallic surface is chemically treated with silane. Silanization of the metallic surface includes diluting silane with distilled water to produce a one-percent (1%) solution of silane by weight. Once the silane is diluted, the solution is allowed to stand for approximately one (1) hour prior to use. During this period, the solution is frequently stirred.

Upon expiration of the standing period, the silane solution is repeatedly applied to the metallic surface. A brush cleaned with ME and thoroughly dried is used to apply the silane solution to the metallic surface. The silane solution is applied with alternating end-to-end brush strokes an circular brush strokes to agitate the solution. A minimum of three applications utilizing alternating brush stroke described above is needed.

In step 80, the silane-treated metallic surface is allowed to dry in air. The surface should not be wiped to induce drying. The surface is now prepared for adhesive bonding and should be bonded within approximately four (4) hours.

Figure 2:
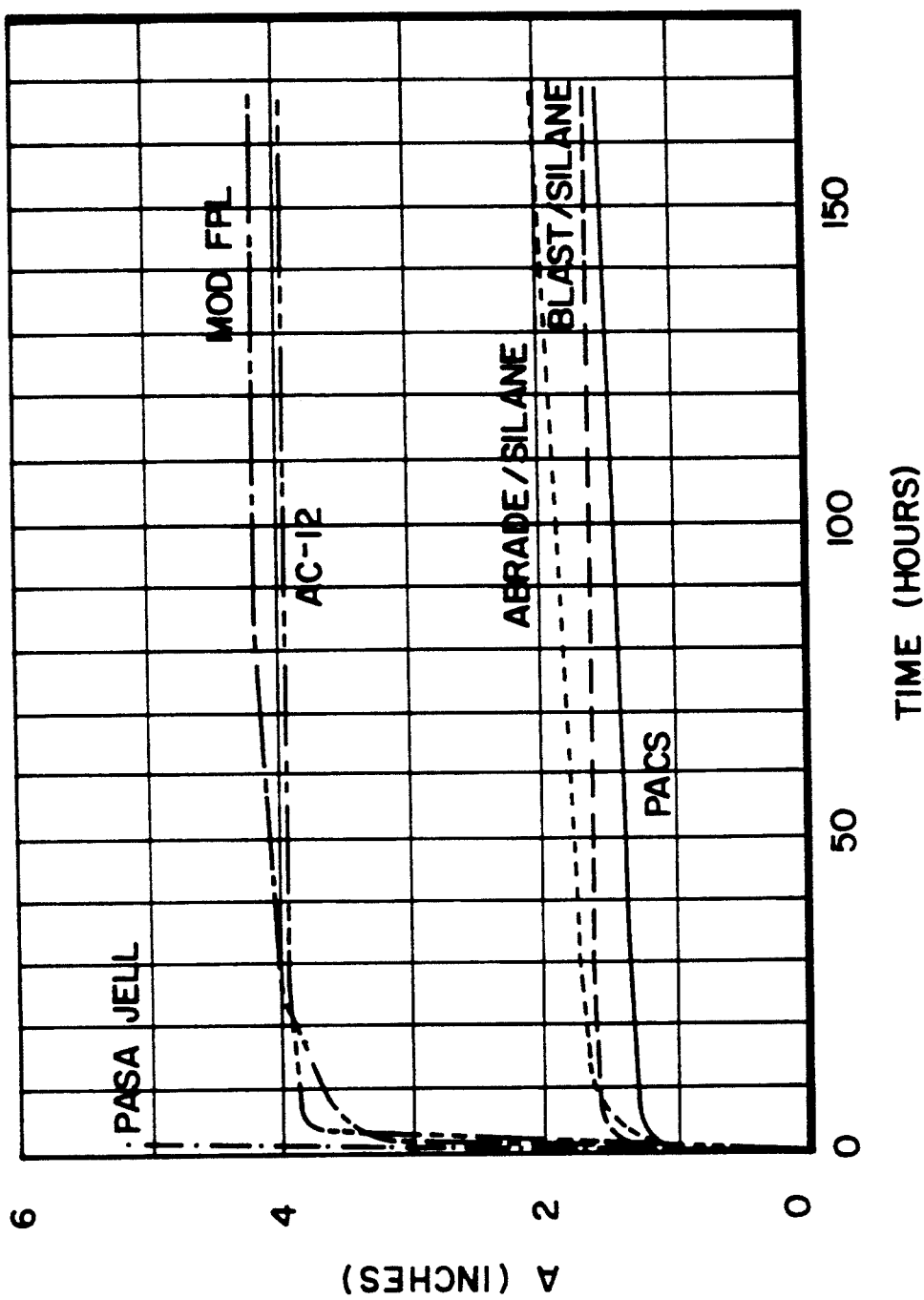
FIG. 2 is a graphical representation of wedge test results comparing the surface preparation method of the present invention with prior art methods of surface preparation.

In FIG. 2, there is shown a graphical representation of wedge test results, comparing the surface preparation method of the present invention with prior art methods of surface preparation such as PACS and FPL. On the graph, the surface preparation method of the present invention is compared with the prior art methods of Phos-Anodizing Containment System (PACS), Modified Forest Product Laboratory (MOD FPL), AC-12 and PASA JELL. Time in hours is plotted on the x-axis while crack length, A, in inches is plotted on the y-axis.

The crack length over time comparisons demonstrate the method of the present invention, labeled "Abrade/-Silane" for the abrasion method of new material exposure and "Blast/Silane" for the blast method of new material exposure, performed better than or comparable with prior art methods of surface preparation without the use of complex and expensive procedures and equipment involving toxic substances.

Although preferred embodiments of the invention have been illustrated in the accompanying drawings and described in the foregoing Detailed Description, it will be understood that the invention is not limited to the embodiments disclosed, but is capable of numerous rearrangements and modifications of steps and elements without departing from the spirit of the invention.

I claim:
1. A method of cleaning a metallic surface for adhesive bonding, comprising the steps of:
   removing surface irregularities and contaminants from a metallic surface;
   abrading the metallic surface to expose new surface material;
   applying a solvent to the abraded metallic surface; and
   treating the metallic surface with a silane solution.

2. The method of claim 1 wherein the step of removing surface irregularities and contaminants includes wiping the surface with an abrasive pad wetted with a solvent.

3. The method of claim 2 wherein the solvent is methyl-ethyl-ketone.

4. The method of claim 1 wherein the step of abrading the metallic surface includes scoring the surface with an abrasive pad.

5. The method of claim 1 wherein the step of applying a solvent to the abraded metallic surface includes wiping the surface with methyl-ethyl-ketone.

6. The method of claim 1 wherein the step of treating the metallic surface with a silane solution further includes the steps of:
   (a) diluting silane to a 1% solution by weight using distilled water;

(b) repeatedly applying the diluted silane to the metallic surface with a brush cleaned with a solvent; and (c) air drying the silane-treated metallic surface.

7. The method of claim 6 wherein the solvent is methyl-ethyl-ketone.

8. A method of cleaning a metallic surface for adhesive bonding, comprising the steps of:

removing surface irregularities and contaminants from a metallic surface;

blasting the metallic surface to expose new surface material;

applying solvent to the blasted metallic surface; and treating the metallic surface with a silane solution.

9. The method of claim 8 wherein the step of removing surface irregularities and contaminants includes wiping the metallic surface with an abrasive pad wetted with a solvent.

10. The method of claim 9 wherein the solvent is methyl-ethyl-ketone.

11. The method of claim 8 wherein the step of blasting the metallic surface includes the use of alumina grit.

12. The method of claim 11 wherein the step of blasting the metallic surface with alumina grit further includes the use of 50-micron alumina grit propelled by pressurized nitrogen gas.

13. The method of claim 8 wherein the step of blasting the metallic surface includes the use of sand.

14. The method of claim 13 wherein the sand is propelled by pressurized nitrogen.

15. The method of claim 8 wherein the step of applying solvent to the metallic surface includes wiping the surface with methyl-ethyl-ketone.

16. The method of claim 8 wherein the step of treating the metallic surface with a silane solution further includes the steps of:

(a) diluting silane to a 1% solution by weight using distilled water;

(b) repeatedly applying the diluted silane solution to the metallic surface with a brush cleaned with a solvent; and (c) air drying the metallic surface.

17. The method of claim 16 wherein the step of repeatedly applying the diluted silane solution includes the use of a brush cleaned with methyl-ethyl-ketone.

18. A method of cleaning a metallic surface for adhesive bonding, comprising the steps of:

removing surface irregularities and contaminants from a metallic surface with an abrasive pad wetted with a solvent;

blasting the metallic surface with nitrogen-gas-propelled alumina grit to expose new surface material;

applying a solvent to the metallic surface; and treating the metallic surface with a silane solution, including the steps of:

(a) diluting silane to a 1% solution by weight using distilled water;

(b) repeatedly applying the diluted silane to the metallic surface with a brush cleaned with a solvent; and (c) air drying the silane-treated metallic surface.

19. The method of claim 18 wherein the step of blasting the metallic surface with alumina grit includes the use of grit with a particle size of 50-microns.

20. The method of claim 18 wherein the steps of removing surface irregularities and contaminants, applying a solvent to the metallic surface and repeatedly applying diluted silane include the use of methyl-ethyl-ketone.

21. A method of cleaning a metallic surface for adhesive bonding, comprising the steps of:

removing surface irregularities and contaminants from a metallic surface with an abrasive pad wetted with a solvent;

blasting the metallic surface with nitrogen gas propelled sand to expose new surface material;

applying solvent to the metallic surface; and treating the metallic surface with a silane solution, including the steps of:

(a) diluting silane to a 1% solution by weight using distilled water;

(b) repeatedly applying the diluted silane to the metallic surface with a brush cleaned with solvent; and (c) air drying the silane-treated metallic surface.

22. The method of claim 21 wherein the solvent used in the steps of removing the surface irregularities and contaminants, applying solvent, and repeatedly applying diluted silane include the use of methyl-ethyl-ketone.

* * * * *

UNITED STATES PATENT AND TRADEMARK OFFICE
CERTIFICATE OF CORRECTION

PATENT NO. : 5,312,520
DATED : May 17, 1994
INVENTOR(S) : J. ("Jaycee") H. Chung It is certified that error appears in the above-identified patent and that said Letters Patent is hereby corrected as shown below:

Title page, Item [75], change "Jaycee H. Chung" to "J. ("Jaycee") H. Chung".

Col. 1, line 57, after "method", insert --a--.

Col. 2, line 3, after "residues", change "ar" to "are".

Col. 4, line 5, after "with", change "ME" to "MEK".

Col. 4, line 8, after "strokes", change "an" to "and".

Col. 4, line 10, after "brush", change "stroke" to "strokes".

Signed and Sealed this

Sixth Day of September, 1994

Attest:

BRUCE LEHMAN

*Attesting Officer*  *Commissioner of Patents and Trademarks*